(12) United States Patent
Droege et al.

(10) Patent No.: US 6,971,025 B1
(45) Date of Patent: Nov. 29, 2005

(54) SECURE PERSONALIZATION OF CHIP CARDS

(75) Inventors: Harmut Droege, Stuttgart (DE); Volker Gottschalk, Liebenzell (DE); Juergen Haardoerfer, Rosstal (DE); Albert Schaal, Tuebingen (DE); Markus Weinlaender, Happurg (DE); Martin Witzel, Schoenaich (DE); Rainer Woerz, Banderbach (DE)

(73) Assignee: International Business Machines Corporation, Armonk, NY (US)

(*) Notice: Subject to any disclaimer, the term of this patent is extended or adjusted under 35 U.S.C. 154(b) by 982 days.

(21) Appl. No.: 09/620,185

(22) Filed: Jul. 20, 2000

(30) Foreign Application Priority Data

Aug. 19, 1999 (DE) .......................................... 199 39 280

(51) Int. Cl.⁷ ............................................. G06F 12/06
(52) U.S. Cl. .......................................... 713/200; 713/1
(58) Field of Search ................................. 713/200, 201, 713/1, 172, 193; 235/492

(56) References Cited

U.S. PATENT DOCUMENTS

| | | | | |
|---|---|---|---|---|
| 4,874,935 A | * | 10/1989 | Younger | 235/492 |
| 5,438,679 A | * | 8/1995 | Inomata et al. | 714/47 |
| 5,889,941 A | * | 3/1999 | Tushie et al. | 713/200 |
| 6,233,683 B1 | * | 5/2001 | Chan et al. | 713/172 |
| 6,390,374 B1 | * | 5/2002 | Carper et al. | 235/492 |

OTHER PUBLICATIONS http://www.fortunecity.com/skyscraper/false/780/linklist.html.*

* cited by examiner

*Primary Examiner*—Gregory Morse
(74) *Attorney, Agent, or Firm*—Louis P. Herzberg; Anne Vachon Dougherty

(57) ABSTRACT

A method of initializing and personalizing a chip card (100) and to a chip card (100) for this purpose. In accordance with the present invention, there are created in the data memory (102) of the chip card (100) data structures (200, 210, 300) which enable the personalizing data which is to be transmitted to the chip card (100) at the time of personalization to be unambiguously assigned to the various chip card applications and thus to the providers of these applications. As a result, the chip card applications are securely isolated from one another at the time of personalization.

15 Claims, 4 Drawing Sheets

# SECURE PERSONALIZATION OF CHIP CARDS

FIELD OF THE INVENTION

This invention relates to a method of initializing and personalizing a chip card and to a chip card for this purpose.

BACKGROUND OF THE INVENTION

When chip cards are being produced, there are two stages in the production process which have to do with loading data into the card, namely initialization and personalization.

During initialization, the structures that will be needed later on, such as files and directories and the correlation between them, are created in the memory of the chip card. Also loaded into the chip card is data, this data being the same for all the cards in a given series or run. Where initialization is concerned, speed has a significant impact on cost.

During personalization, secret and/or card-specific information is loaded into the chip card. If for example the number of the card-issuing body, which is the same for all the cards, was recorded at the time of initialization, then at the time of personalization it is for example the credit card number, which is specific to the card, which is programmed into the memory of the card. An important requirement in this case is that personalization should be possible only for those data fields which are intended to be personalized. It must be ensured that the data is written to the right place, i.e. only to the fields which were set aside for personalizing data at the time of initialization. The way in which this requirement is met is that so-called placeholders are loaded into the memory of the chip card during initialization. When personalizing, data is then being transmitted to a field intended for such data during personalization, additional information is passed to the chip card along with the personalizing data. This additional information is then compared with the information stored in the placeholder. If the two sets of information are the same, the personalizing data is written to the memory of the chip card. However, a check of this kind is not sufficiently robust to rule out the possibility of misuse. There are known chip cards which have a plurality of chip card applications stored on them. A chip card application is a service which the chip card is able to provide, such as a payment function (chip card application A) or an electronic driver's license (chip card application B). To guarantee security when the chip card is being personalized, it is necessary for the chip card applications to be isolated from one another at the time of personalization, i.e. for it to be ensured that only the provider of chip card application A is able to personalize chip card application A or in other words is able to load data for chip card application A into the card. The same applies to the provider of chip card application B and to any other chip card applications. To date, secure isolation between chip card applications at the time of personalization has not been achieved in any chip card personalizing system.

The object of the present invention is to provide a method for the improved initialization and personalization of chip cards and a chip card for this purpose.

SUMMARY OF THE INVENTION

In accordance with the present invention, data structures are created on the chip card which allow the data which is to be transmitted to the chip card at the time of personalization to be unambiguously assigned to the individual chip card applications and thus to the providers of these applications. This produces secure and reliable isolation between the chip card applications at the time of personalization. The present invention makes it impossible during personalization for personalizing data to be written to data fields not intended for this purpose by, for example, the providers of chip card applications. The present invention allows robust personalization of the fields for personalizing data which were defined as such at the time of initialization, where only the locations intended for this purpose in the memory of the chip card can be personalized. No additional storage space is required in the memory of the chip card in order to put the present invention into practice. At the same time, the initialization required for personalization of this kind can be carried out without any loss of speed in comparison with conventional methods of initialization.

BRIEF DESCRIPTION OF THE DRAWINGS

The invention will be described in greater detail below by reference to preferred embodiments. In the drawings.

DETAILED DESCRIPTION OF THE INVENTION

Figure 1:
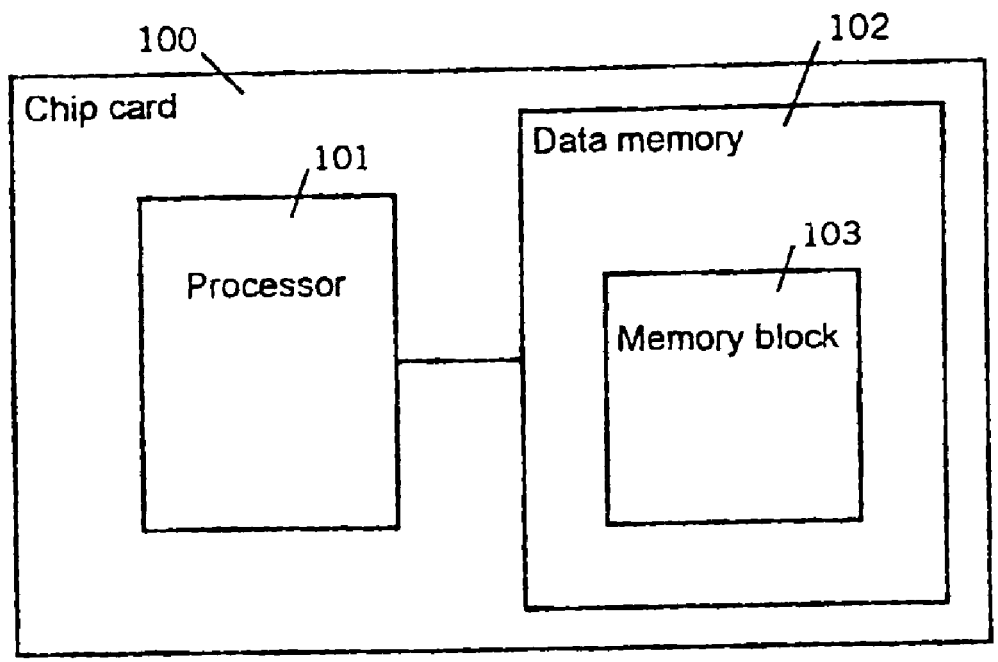
FIG. 1 is a diagram showing the layout of a chip card having a data memory and individual memory blocks.

FIG. 1 shows a chip card 100 as used in a preferred embodiment of the present invention. The chip card in question is a so-called smart card or in other words a chip card having a processor 101, data memory 102 and software, such as the chip card operating system. It is preferable in this case for the data memory 102 of chip card 100 to be managed by a memory manager which is located on chip card 100 and which is, for example, part of the chip card operating system. The memory manager divides data memory 102 on chip card 100 into individual memory blocks 103. This division is preferably performed dynamically, i.e. to suit the storage space required by the individual operating system functions or chip card applications. Each memory block 103 has a physical address which is managed by the memory manager. Since these addresses depend on the version of the chip card operating system which is current, on the chip card hardware which is being used, and on other incidental conditions, what are used in the preferred embodiment are offsets. If an area is to be initialized in memory 102 of chip card 100, to create a file for example, a free memory block 103 is assigned, and data written to it if required, by means of a chip card command such as CREATE FILE. To allow data to be written to a particular area within block 103, what is preferably used in turn is an offset, which is, for example, referred to the start of block 103. By using relative memory addresses it becomes possible to escape from the constraints imposed by hardware-specific, physical memory addresses.

Figure 2:
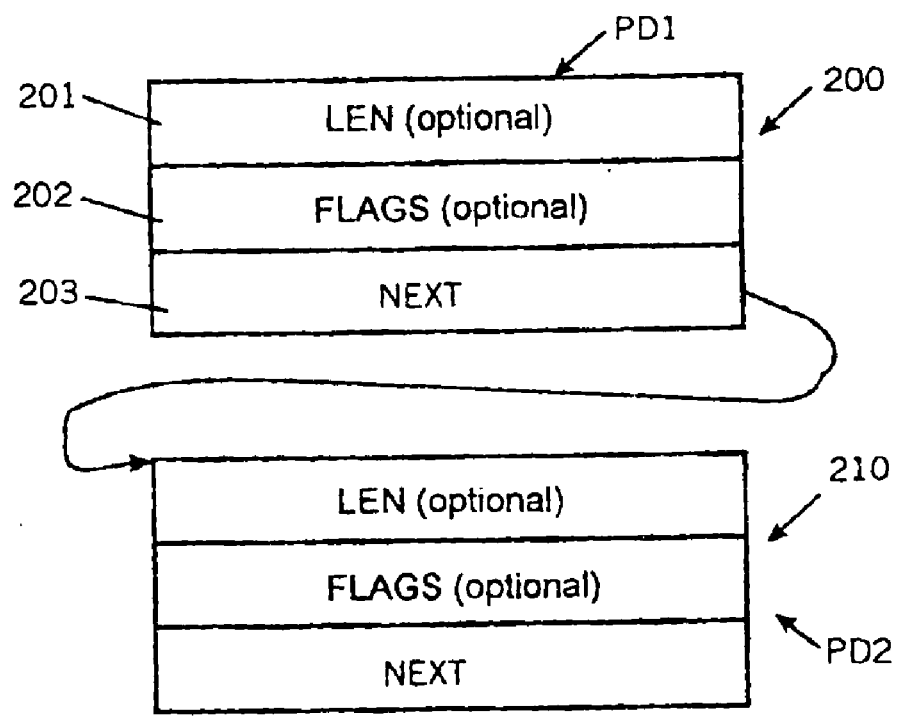
FIG. 2 is a diagram showing the layout of two personalization descriptors (PD's) and the logic connection between them, according to the present invention.

In what follows, a description will be given of the initialization which serves as a preparation for the personalization of chip card 100. During the initialization, a so-called personalization descriptor (PD) is written to every location within a memory block 103 which is intended to hold a field of personalizing data. FIG. 2 shows the layout of a PD 200. Each personalization descriptor contains an offset field NEXT 203. In addition to this, each personalization descriptor may also contain a length field LEN 201 and a status field FLAG 202. To define other personalization characteristics it is possible for other, optional fields to be inserted.

If it is necessary for more than one personalizing record to be transmitted in order to personalize a chip card application, storage locations for this purpose are reserved in data memory 102 of chip card 100 by other PD's in the course of the initialization. The offset field NEXT 203 of PD 200 specifies the offset, i.e. the memory address, of a further PD 210. By means of the offset field 203, the PD's 200, 210 required are organized into PD lists so that there are a series of PD's 200, 210, etc. in a set order laid down for the personalization process. From the organizational point of view, PD's 200, 210, etc. in this case are connected together in the same order as that in which the personalizing data will be transmitted to chip card 100 during the subsequent personalization. To indicate that the PD list does not contain any further items, or that it consists of only a single item, what can for example be done is to make the content of the offset field 203 of the last PD zero. FIG. 2 shows how two PD's, PD1 and PD2 in this case, are connected to form a PD list. The use of relative memory addresses means, as described above, that the constraints of physical addresses can be avoided, which is particularly advantageous when retrospective changes have to be made to the chip card hardware or operating system.

To increase the robustness of the personalization, the optional length field LEN 201 can be put in. What is stated in length field LEN 201 of PD 200 is the length, in bytes for example, of the field for personalizing data which will take the place of the PD 200 to which length field 201 belongs during the subsequent personalization.

It is preferable for the length of a PD 200 which is written to data memory 102 during initialization to be smaller than that of the field of personalizing data which will be transmitted subsequently. The length of a PD may be 4 bytes for example, whereas that of a field of personalizing data may for example be 40 bytes. However, it is equally possible for a PD 200 to be the same size as its associated field of personalizing data. The introduction of length field 201 makes it possible for protection to be obtained against the destruction of the initialized memory structures.

To provide even greater security during personalization, the optional status field FLAGS 202 can be put in. The status field 202 of a PD 200 is used to store various status bits, known as flags, which specify what characteristics need to be exhibited by the personalizing data which will be written in place of PD 200 at the time of personalization. It can for example be specified in this way whether the personalizing data must be encrypted/non-encrypted and/or signed/unsigned, etc.

The introduction of extended personalization descriptors of this kind makes it possible for the personalization process to be controlled in a way which can be individually defined for each personalizing record.

Figure 3:
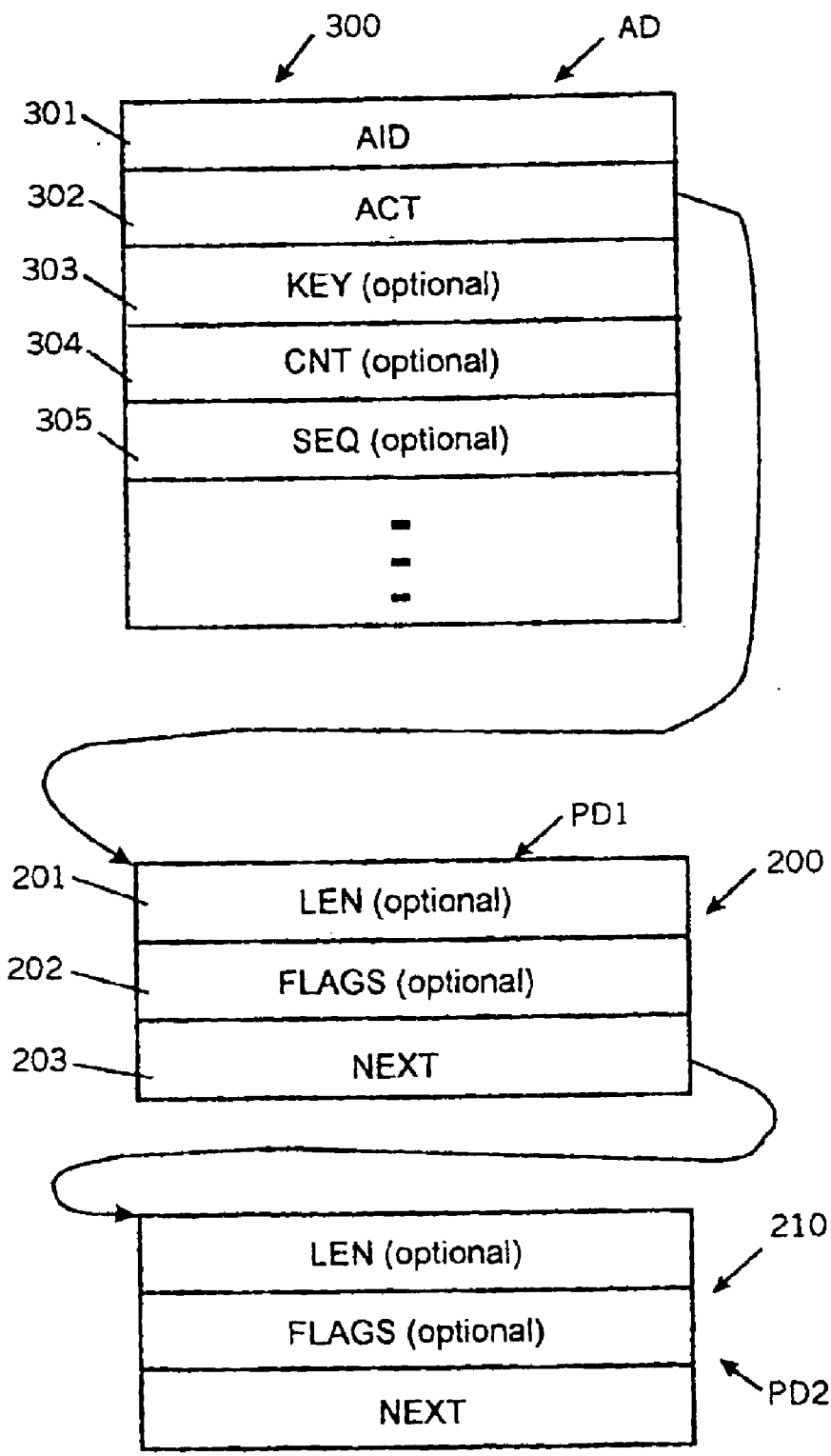
FIG. 3 is a diagram showing the layout of an application descriptor (AD) and two personalization descriptors (PD's) and the logic connections between them, according to the present invention.

Also, during the initialization at least one application descriptor (AD) is created for each chip card application in memory 102 of chip card 100. Since the chip card applications are each assigned to a provider, the ADs too are assigned to the providers of the chip card applications. The layout of an AD 300 is shown in FIG. 3.

To allow it to be identified, an AD 300 includes an application designator 301 which designates the chip card application which is to be personalized using AD 300. The application designator 301 will be referred to in what follows as an application identifier (AID). AID 301 preferably includes the name of the relevant chip card application and an unambiguous numerical identification for AD 300.

AD 300 also includes the offset ACT 302 for the next PD to be processed. Offset field 302 is so initialized in this case that before personalization begins it points to the first PD 200 in a PD list.

AD 300 may also include other data, such as key data KEY 303 for the use of cryptographic security mechanisms, such as for the decrypting of personalizing data transmitted in encrypted form or for the checking of a signature. This allows any provider of chip card applications to individually formulate the cryptographic security procedures which are to be applied during personalization.

AD 300 may also include a mis-operation counter CNT 304 and to increase the robustness of the personalization it may include a so-called sequence counter SEQ 305, which is a counter that is incremented each time a personalizing record is successfully entered in data memory 102 of chip card 100 and which can, for example, be used during personalization to synchronize with external database applications.

Each PD 200, 210, etc. can be assigned to only one PD list, with each PD list being assigned in turn to one specific AD 300 and hence to one chip card application. If there is more than one chip card application on chip card 100, there must also be more than one PD or PD list. In this way the chip card applications are isolated from one another. The way of initializing which has been described, where PD's 200, 210, etc. are organized into lists and the individual PD lists are each coupled to one AD 300, means that the personalization fields are unambiguously assigned to the various providers of the particular chip card applications involved. Since any one AD 300 is assigned to only one chip card application, security-related data such as the key data KEY 303 is also unambiguously assigned to a given chip card application.

Figure 4:
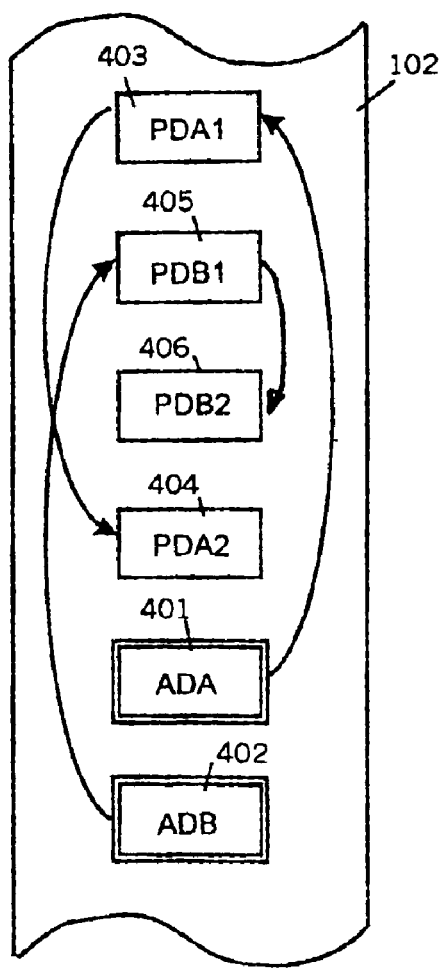
FIG. 4 shows the data memory of a chip card after initialization in accordance with the invention.

What is found after the initialization steps which have been described to prepare for personalization, is for example the memory map shown in FIG. 4, which also shows the logic connections between the individual elements. What is shown as an example is a data memory 102 containing two chip card applications A and B to each of which is assigned an application descriptor (ADA 401 and ADB 402). Application descriptor ADA 401 in turn has personalization descriptors PDA1 403 and PDA2 404 assigned to it, and application descriptor ADB 402 has personalization descriptors PDB1 405 and PDB2 406 assigned to it. It is an advantage that, as shown in FIG. 4, both the application descriptors 401, 402 and the personalization descriptors 403, 404, 405, 406, can be stored in a random order in data memory 102 of chip card 100.

Figure 6:
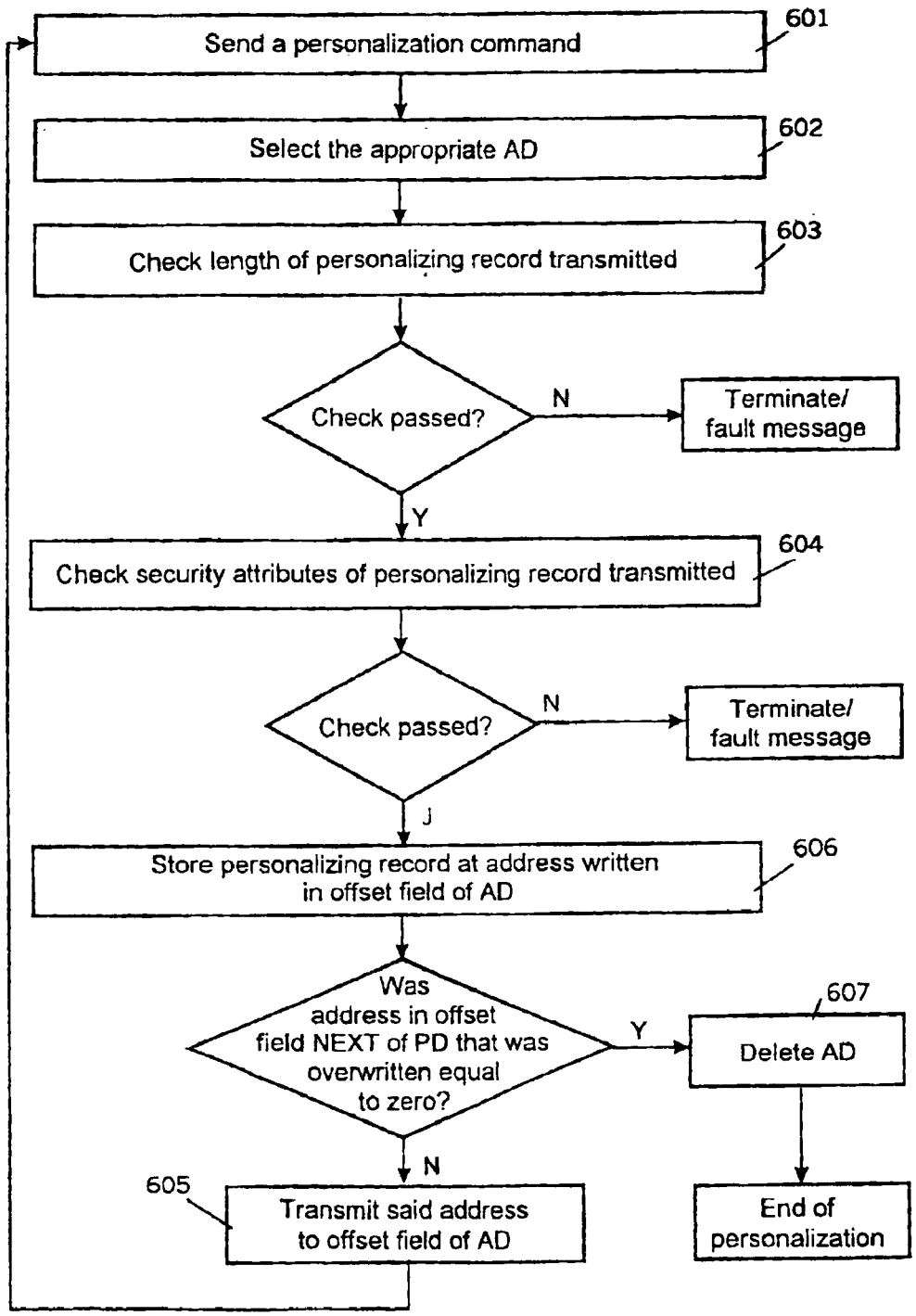
FIG. 6 is a flow chart for a personalizing operation in accordance with the present invention.

The initialization of chip card 100 having been described, a closer look will now be taken at its personalization, in which the secret and/or card- or user-specific personalizing data is loaded into chip card 100. In describing the individual steps of the personalization process reference will be made to FIG. 6. In the embodiment described, fields LEN and FLAGS are included in the personalization descriptor.

The personalization is performed by working down the PD list for each AD 401, 402. What will be described here as an example is the personalization of a chip card application A. For this purpose, as shown at step 601, a personalization command of the form PERSONALIZE (AID, first personalization record), which contains the identifier AID 301 of the AD 401 assigned to the relevant chip card application and a first personalizing record, is sent to chip card 100 by, for example, an operator who is carrying out the personalization. The transmission of identifier AID 301 initiates the personalization process in chip card 100. With the help of functions provided by the chip card operating system, the AD of chip card application A, which has a corresponding identifier AID and in the present case (see FIG. 4) is designated ADA 401, is selected from the AD's 401, 402 present in data memory 102 (step 602). For error-free personalization, the personalizing record which is transmitted must contain the data which is to be written to the appropriate first field for personalizing data, which is PDA1 403 in the present case.

In the event of chip card 100 being intended for use of a type where only a single application descriptor AD is needed, the presence of identifier AID 301 in the application descriptor and in the personalization command can be dispensed with.

Then, in step 603, a check is made in chip card 100 to see whether the value in length field 201 of that PD for which a locating reference is given by offset field ACT 302 of ADA 401, meaning PDA1 403 in the present case, is the same as the length of the personalizing record transmitted in the personalization command.

If it is, the personalizing record is checked in step 604 to see whether it satisfies the security requirements laid down in status field FLAGS 202 of PDA1 403. If, for example, it is specified in the FLAGS status field that the personalizing data transmitted must be accompanied by a digital signature, then, for example, a check is made on the data to see whether a signature of this kind is present and whether it has not been altered. The signature may, for example, be checked by using key data KEY 303 from ADA 401, which may include a suitable signature key. Or if, for example, it is specified in the FLAGS status field that the personalizing data transmitted must be encrypted, then for example a check may be made on this encryption and/or the data may be decrypted, using for example key data KEY 303 from ADA 401, which may include an appropriate cryptographic key. To allow security attributes to be checked, the personalization command may include figures with which to compare check sums and so on. All the safety criteria defined in the FLAGS status field are preferably dealt with in step 604.

If the security check is successfully passed, then in step 605 offset field ACT 302 in ADA 401 is overwritten with the offset field NEXT 203 stored in PDA1 403. The personalizing record (encrypted where appropriate) is written to the location in data memory 102 at which PDA1 403 is stored. Since PDA1 403 is thus overwritten, optimum use is made of the storage capacity of the data memory.

If the optional fields are not being used, the check on the length of the personalizing data and/or on the security requirements does not take place and this means a rise in the speed of personalization. With this very fast personalization, the personalizing data is simply transmitted to chip card 100 in its set order and is written to the fields reserved for it there.

When this is done, the isolation between the applications is guaranteed by the principle of addressing employed based on PD's and AD's.

For personalization, in accordance with the present invention, it is not necessary to transmit to chip card 100 any information additional to the actual personalization data (and identifier AID 301 where there is more than one application descriptor present) relating to spaceholders which are present, because all the information required, and particularly the information on the memory addresses to be used during the personalization, is already present on the card. The data transmission time required for the personalization process is reduced accordingly. As a result, personalization is possible at a considerably faster speed than previously, particularly when use is not made of time-consuming options such as counter SEQ 305.

The operations on chip card 100 which are needed during the initialization and personalization processes and which have been described, and particularly steps 602 to 607, and the checks and calculations which have to be made, are carried out on chip card 100 by running suitable software routines, which may for example be implemented in the chip card operating system, on processor 101.

If it was specified at the time of initialization, by for example setting an appropriate bit in status field FLAGS 202 of PDA1 403, that the first personalization record must be accompanied by a certain signature, then because of the security check only a person who transmits to chip card 100 a personalization record which meets this requirement can overwrite PDA1 403. This rules out the possibility of other PD's 404, 405, 406 being overwritten either accidentally or intentionally. Since individual security attributes were defined for each PD 403, 404, 405, 406, i.e. for each field for personalizing data, back at the time of initialization, the personalization of each individual field for personalizing data can be individually controlled. And once the security attributes have been defined, they cannot be evaded at a later date.

Alternatively, it can be specified during the initialization, for example by an appropriate control bit in status field FLAGS 202, that the personalizing record transmitted in the personalization command may be shorter than laid down, i.e. its length may be less than the value given in length field LED 201 of the relevant PD. Since the amount of personalizing data transmitted in this case is less, the storage space in data memory 102 of chip card 100 which has already been reserved but will not be used can be filled with stuffing bytes. Hence the security check will be made in this case even when the personalizing record transmitted is shorter than was specified at the time of initialization.

Figure 5:
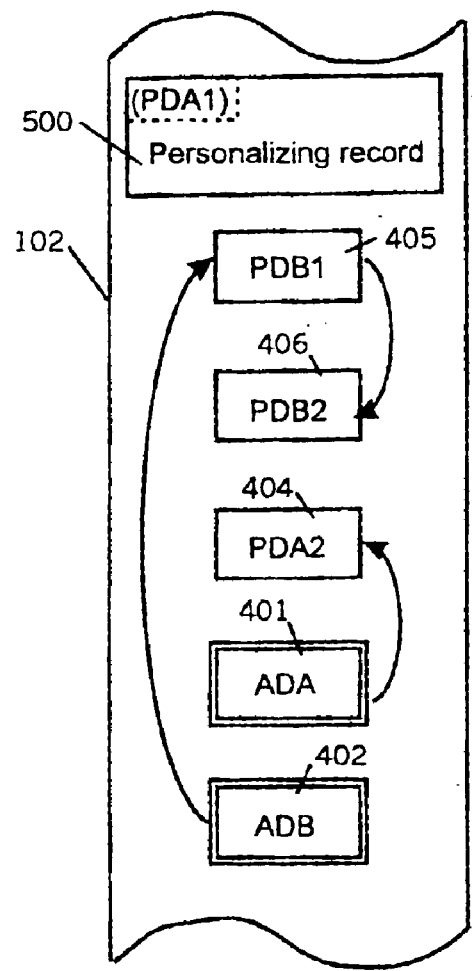
FIG. 5 shows the data memory of a chip card during personalization in accordance with the invention.

The situation in data memory 102 of chip card 100 is shown in FIG. 5, in which the logic connections between the individual elements are once again shown as well. The place of PDA1 403 has been taken by the personalizing record 500 which was transmitted (in FIG. 5 the original position of PDA1 403 is indicated in broken lines). The offset field ACT 302 of ADA 401 points to PDA2 404. The data structures (ADB, PDB1, PDB2) for chip card application B are unchanged.

At the next personalization command, by using a personalization command of the form PERSONALIZE (AID, second personalizing record) for example, PDA2 404 can be overwritten. Alternatively, it would be possible to begin by overwriting PDB1 405, and so on. What must be remembered is that the order in which the personalizing records to be transmitted are arranged must be the same as that in which PD's 403, 404, 405, 406 are connected in the given PD list. To assist in this, counter SEQ 305 for example can be used.

Once all the PD's of an AD have been overwritten, i.e. once the PD list does not contain any further items, which may be indicated by the fact that the offset field NEXT 203 of the last PD has a content of zero, then in step 607 the AD which was used of the relevant chip card application is deleted. The chip card application has been fully loaded.

In one embodiment of the invention, the identifier AID 301 is only transmitted in the personalization command in cases where a new application descriptor AD is to be selected, for example when the first personalization command is transmitted. For as long as no subsequent personalization command contains an identifier AID 301, the assignment of the personalizing data transmitted to the appropriate application descriptor takes place automatically, for example by using appropriate functions in the chip card operating system. Only when another identifier AID 301 is transmitted will a corresponding new AD be selected.

The personalization on chip card 100 is performed using known, and for example predefined, services and routines provided by the chip card operating system which can be called up by commands such as the personalization command.

What is claimed is:

1. Method of initializing and personalizing a chip card, wherein data for more than one chip card application is transmitted to the data memory of the chip card, comprising the steps of:

during initialization:
   writing at least one application descriptor for each chip card application to the data memory of the chip card, said application descriptor designating the chip card application and comprising details of the memory address of a first personalization descriptor in a list of a plurality of personalization descriptors associated with said application;
   writing at least one personalization descriptor to the data memory of the chip card, with the personalization descriptor comprising details of the relative memory address of the next successive personalization descriptor in said list associated with said application; and during personalization:
   transmitting personalizing data for a chip card application to the chip card;
   writing of the personalizing data to the data memory of the chip card at the memory address for the first personalization descriptor indicated by the details in the application descriptor;
   transmitting the details of the relative memory address of the next successive personalization descriptor taken from the first personalization descriptor to the application descriptor so that the next successive personalization descriptor is then assigned to the application descriptor; and
   repeating the steps of personalization for all of the personalizing data which has to be transmitted for each chip card application, wherein the memory addresses for the personalization descriptors associated with each chip card application are distinct from the memory addresses of the personalization descriptors associated with other chip card applications.

2. The method according to claim 1, wherein the application descriptor includes details unambiguously assigning it to a particular chip card application.

3. The method according to claim 1, wherein the personalization descriptor further includes details which define the characteristics of the personalizing data to be transmitted, and wherein the method comprises the additional step of checking the personalizing data transmitted to determine whether it satisfies the details, and wherein the writing of the personalizing data to the data memory of the chip card takes place only if the details are satisfied.

4. The method according to claim 3, wherein the personalizing data is checked against the details from the personalization descriptor which is currently assigned to the application descriptor.

5. The method according to claim 3, wherein the personalizing data is checked using information included in the application descriptor.

6. The method according to claim 3, wherein the details included in the personalization descriptor include the length of the personalizing data.

7. The method according to claim 3, wherein the details included in the personalization descriptor include security requirements which the personalizing data is required to meet.

8. The method according to claim 1, wherein the application descriptor includes a counter, which method includes the additional step of incrementing the counter each time a personalizing record is successfully entered in the data memory of the chip card.

9. A chip card having a processor for running software routines, a data memory and at least software routine for performing the method steps of:

during initialization:
   writing at least one application descriptor for each chip card application to the data memory of the chip card, said application descriptor designating the chip card application and comprising details of the memory address of a first personalization descriptor in a list of a plurality of personalization descriptors associated with said application;
   writing at least one personalization descriptor to the data memory of the chip card, with the personalization descriptor comprising details of the relative memory address of the next successive personalization descriptor in said list associated with said application; and during personalization:
   receiving personalizing data for a chip card application to the chip card;
   writing the personalizing data to the data memory of the chip card at the memory address for the first personalization descriptor indicated by the details in the application descriptor;
   transmitting the details of the relative memory address of the next successive personalization descriptor taken from the first personalization descriptor to the application descriptor so that the next successive personalization descriptor is then assigned to the application descriptor; and
   repeating the steps of personalization for all of the personalizing data which has to be provided to the chip card for each chip card application, wherein the memory addresses for the personalization descriptors associated with each chip card application are distinct from the memory addresses of the personalization descriptors associated with other chip card applications.

10. A chip card according to claim 9, wherein the data memory contains, before the personalization of the chip card begins,:

at least one application descriptor for a chip card application which descriptor includes details of a memory address of a personalization descriptor, and at least one personalization descriptor which includes details of a memory address of the next personalization descriptor.

11. A chip card according to claim 10, wherein the application descriptor includes details of the chip card application assigned to it.

12. A chip card according to claim 10, wherein the application descriptor includes information which can be used for a check on the personalizing data.

13. A chip card according to claim 10, wherein the personalization descriptor also includes details which define the characteristics of the personalizing data to be transmitted.

14. A chip card according to claim 10 wherein the application descriptor includes a counter which is incremented each time a personalizing record is successfully entered in the data memory of the chip card.

15. A program storage device readable by machine, tangibly embodying a program of instructions executable by the machine to perform method steps for initializing and personalizing a chip card, wherein data for more than one chip card application is transmitted to the data memory of the chip card, said method steps comprising:

during initialization:

writing at least one application descriptor for each chip card application to the data memory of the chip card, said application descriptor designating the chip card application and comprising details of the memory address of a first personalization descriptor in a list of a plurality of personalization descriptors associated with said application;

writing at least one personalization descriptor to the data memory of the chip card, with the personalization descriptor comprising details of the relative memory address of the next successive personalization descriptor in said list associated with said application; and during personalization:

transmitting personalizing data for a chip card application to the chip card;

writing of the personalizing data to the data memory of the chip card at the memory address for the first personalization descriptor indicated by the details in the application descriptor;

transmitting the details of the relative memory address of the next successive personalization descriptor taken from the first personalization descriptor to the application descriptor so that the next successive personalization descriptor is then assigned to the application descriptor; and repeating the steps of personalization for all of the personalizing data which has to be transmitted for each chip card application, wherein the memory addresses for the personalization descriptors associated with each chip card application are distinct from the memory addresses of the personalization descriptors associated with other chip card applications.

* * * * *